United States Patent [19]
Clarke et al.

[11] Patent Number: 5,525,394
[45] Date of Patent: *Jun. 11, 1996

[54] ORIENTED STRAND BOARD-FIBERBOARD COMPOSITE STRUCTURE AND METHOD OF MAKING THE SAME

[75] Inventors: John T. Clarke; Peter P. S. Chin, both of St. Charles, Ill.; Craig R. Lindquist, Cordele, Ga.; Michael J. MacDonald, Batavia; J. Peter Walsh, Sycamore, both of Ill.

[73] Assignee: Masonite Corporation, Chicago, Ill.

[ * ] Notice: The term of this patent shall not extend beyond the expiration date of Pat. No. 5,425,976.

[21] Appl. No.: 368,629

[22] Filed: Jan. 4, 1995

Related U.S. Application Data

[63] Continuation of Ser. No. 97,862, Jul. 26, 1993, Pat. No. 5,425,976, which is a continuation of Ser. No. 670,681, Mar. 20, 1991, abandoned, which is a continuation-in-part of Ser. No. 503,573, Apr. 3, 1990, abandoned.

[51] Int. Cl.$^6$ .................................................. B32B 5/12
[52] U.S. Cl. ..................... 428/105; 162/131; 162/132; 162/133; 162/225; 428/106; 428/109; 428/110; 428/170; 428/171; 428/218; 428/219; 428/220; 428/337; 428/339; 428/537.1
[58] Field of Search .................................. 428/110, 218, 428/294, 337, 339, 106, 109, 219, 170, 171, 220, 537.1, 105; 162/131, 133, 132, 225, DIG. 6; 156/62.2

[56] References Cited

U.S. PATENT DOCUMENTS

| | | | |
|---|---|---|---|
| 2,343,740 | 3/1944 | Birmingham | 154/40 |
| 2,545,603 | 12/1947 | Byers et al. | 154/132 |
| 2,831,793 | 4/1958 | Elmendorf | 154/45.9 |
| 2,979,105 | 4/1961 | Burkner | 154/1 |
| 3,098,781 | 7/1963 | Greten | 156/373 |
| 3,164,511 | 1/1965 | Elmendorf | 428/110 |
| 3,171,872 | 3/1965 | Jarrett et al. | 256/113 |
| 3,308,013 | 3/1967 | Bryant | 162/103 |
| 3,846,219 | 11/1974 | Kunz | 161/119 |
| 4,035,120 | 7/1977 | Eriksson | 425/81 |
| 4,063,858 | 12/1977 | Axer et al. | 425/81 |
| 4,068,991 | 1/1978 | Ufermann et al. | 425/81 |
| 4,122,236 | 10/1978 | Holman | 428/453 |
| 4,131,705 | 12/1978 | Kubinsky | 428/106 |
| 4,210,692 | 7/1980 | Bohme | 428/106 |
| 4,241,133 | 12/1980 | Lund et al. | 428/326 |
| 4,246,310 | 1/1981 | Hunt et al. | 428/106 |
| 4,361,612 | 11/1982 | Shaner et al. | 428/106 |
| 4,364,984 | 12/1982 | Wentworth | 428/106 |
| 4,379,193 | 4/1983 | Hunt | 428/196 |
| 4,379,194 | 4/1983 | Clarke et al. | 428/203 |
| 4,468,264 | 8/1984 | Clarke et al. | 156/62.2 |
| 4,610,913 | 9/1986 | Barnes | 428/215 |
| 4,647,324 | 3/1987 | Mtangi et al. | 156/62.2 |

FOREIGN PATENT DOCUMENTS

| | | | |
|---|---|---|---|
| 597587 | 5/1960 | Canada . | |
| 7704563 | 5/1978 | Germany . | |
| 3821216 | 3/1961 | Japan | 428/106 |

OTHER PUBLICATIONS

Siempelkamp Bulletin, dated Mar. 4, 1988 (cover page and p. 6).

Primary Examiner—Nasser Ahmad
Attorney, Agent, or Firm—Marshall, O'Toole, Gerstein, Murray & Borun

[57] ABSTRACT

An oriented strand board product is provided. The board is comprised of a baseboard having three wood strand layers, the wood strands being oriented in space with respect to a board-forming machine such that a core layer is comprised of wood strands oriented generally in a random or cross-machine direction and each adjacent layer is comprised of coarse and fine wood strands oriented generally in the machine direction and wherein the wood strands comprising each adjacent layer are formed with the coarsest strands located nearest the core layer and the finest strands are located nearest the outer surfaces of each outer board layer. The OSB board product is clad with a dry felted wood fiber overlay on one planar surface of the baseboard.

21 Claims, 5 Drawing Sheets

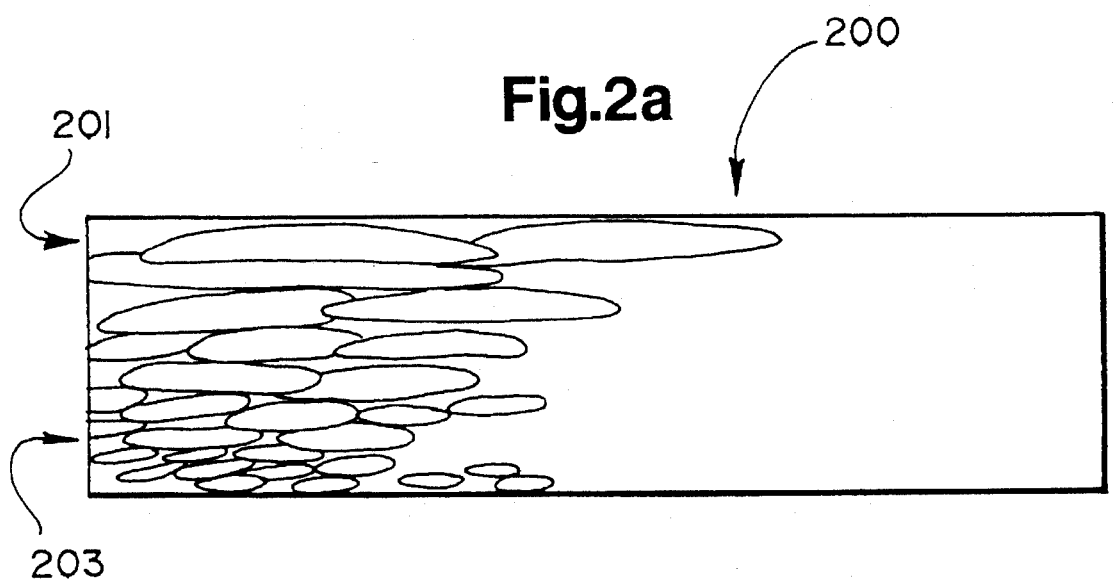
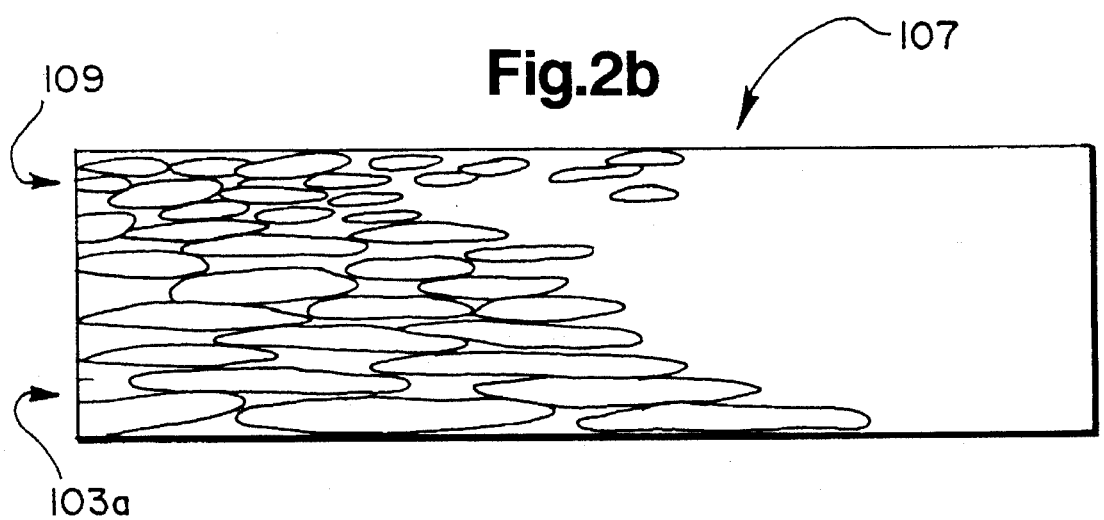

ORIENTED STRAND BOARD-FIBERBOARD COMPOSITE STRUCTURE AND METHOD OF MAKING THE SAME

CROSS REFERENCE TO RELATED APPLICATION

This application is a continuation of U.S. application Ser. No. 08/097,862 filed Jul. 26, 1993, now U.S. Pat. No. 5,425,976; which is a continuation of U.S. application Ser. No. 07/670,681 filed Mar. 20, 1991, abandoned, which is a continuation-in-part of application Ser. No. 07/503,573, filed Apr. 3, 1990, abandoned.

FIELD OF THE INVENTION

The present invention is directed to oriented strand board (OSB) and, more particularly, to an improved OSB-fiberboard composite structure having a fiberboard surface which will resist weathering and OSB-fiberboard delamination. The surface of the improved fiberboard may be readily embossed with relatively deep patterns, can maintain sharp outside embossed corners in board or panel construction, and may be finished with paint or the like manner so that the product can be used as a visible siding or panelling.

BACKGROUND OF THE INVENTION

OSB is made from flakes that are created from debarked round logs by placing the edge of a cutting knife parallel to a length of the log and slicing thin flakes from the log. The thickness of the flake is approximately 0.010 to 0.030 inch. The cut flakes are subjected to forces that break the flakes into strands having a length parallel to the grain of the wood several times the width of the strand. The strands can be oriented on the board forming machine with the strands predominantly oriented in a single, e.g., cross machine direction in one layer and predominantly oriented in the generally perpendicular (machine) direction in adjacent layers. The various layers are bonded together by natural or synthetic resin(s) under heat and pressure to make the finished OSB product.

The common grade of OSB is used for sheathing walls and decking roofs and floors where strength, light weight, ease of nailing, and dimensional stability under varying moisture conditions are the most important attributes. In these applications, the appearance and/or weathering of the rough surfaces are not of concern since the product will be covered with roofing, siding, or flooring. Because of the unfinished attributes of utility grade OSB, it commands a relatively low price in the marketplace and is sold at a discount to structural grades of softwood plywood.

The light weight, ease of nailing, and dimensional stability of OSB are attributes much desired in siding products but, due to the irregular surface, OSB has required surface modification before being used as siding or otherwise where aesthetics is important to the consumer. If the material could be imparted with the surface smoothness, coatability, and weatherability of hardboard while retaining its other desirable structural properties, it would be significantly improved in comparison to the commodity structural grade. Others have pursued this objective along different lines with partial success.

One attempt to prevent telegraphing is described in Greten U.S. Pat. No. 3,098,781. The Greten '781 patent discloses a particle board product made from materials, such as flakes, wherein the flakes are graduated in size from the center or core to the outer surfaces, with the coarsest flakes at the core and the finer flakes, together with fines, at one or both outer surfaces. The Greten produced particle board is disclosed to have the advantage of accepting an overlay of veneer, paper or plastic sheets without "telegraphing" the relatively irregular surface of the underlying particle board.

Similar OSB siding products are commercially sold that include a resin-bonded overlay of paper laminated to one surface. The paper can accept a limited degree of embossing but it cannot stretch to accept deep, embossing. When embossed beyond a certain depth, the paper ruptures from the tensile strain and reveals the underlying flakes. Furthermore, exposure to the weather causes irreversible swelling of the flakes in thickness which telegraphs the structure of the underlying baseboard (OSB) through the thin overlay and creates a bumpy, irregular exposed surface. The result is an unsightly appearance of the front surface, especially of product that is unembossed or only slightly embossed.

Another example is described in Wentworth U.S. Pat. No. 4,364,984 where wood fines are distributed on the surface of the flake baseboard (OSB) graduated with the coarsest wood fines adjacent to the flakes and the finest on the visible surface. Since the fines are bundles of wood fibers which retain the stiffness of wood, they do not consolidate into a tight surface, but rather, retain susceptibility to the ready entry of water and do not holdout paint to a satisfactory degree.

Similarly, Ufermann, et al. U.S. Pat. No. 4,068,991 discloses a particle board, e.g., chipboard product that includes a continuous particle size gradient between a coarser particle core and a finer particle surface layer wherein the particle size gradient transition from one particle size to another can be continuous or step-wise.

Others have disclosed the manufacture of laminates of plywood or particle board with a wet process fiberboard surface, e.g., Birmingham U.S. Pat. No. 2,343,740; Bryant U.S. Pat. No. 3,308,013 and Shaner, et al. U.S. Pat. No. 4,361,612 discloses forming an oriented strand board (OSB), that may be in three or more layers, formed from a mixture of hardwood species and then laminating the OSB to a veneer, wet process hardboard or plywood face panel.

One of the problems associated with the application of an overlay onto an OSB baseboard is that of achieving a strong bond at the interface between the OSB and the overlay capable of resisting weathering. The above-described Wentworth U.S. Pat. No. 4,364,984 suggests that a strong bond can be achieved at the interface between an OSB product and a fine particle overlay by manufacturing the OSB with the largest OSB flakes at the interface, and applying the overlay fine particles such that the longest fines are disposed at the interface. Similarly, the Shaner, et al. U.S. Pat. No. 4,361,612 discloses that shorter fibers in the surface of an OSB product will degrade the bending strength of an OSB product. Further, the Shaner '612 patent teaches that a laminated wood product that includes a flakeboard core laminated to a wood veneer, a wet process hardboard or a wet process fiberboard overlay, as in typical plywood practice, may need a core finishing operation on a drum sander to achieve a core surface capable of good bonding to the overlay.

Bryant U.S. Pat. No. 3,308,013 suggests that a water laid fiber sheet containing resin and having a basis weight of dry fiber from 30 to 750 pounds per thousand square feet can be employed to mask defects in plywood, particleboard, and the like. These heavy papers have been used to produce medium density overlain plywood that has found application in road signs where the smooth surface accepts lettering and reflective laminates. High cost, limited embossability, poor weathering, and poor adhesion of coatings preclude the use of this product in siding applications.

It has been found, in accordance with the present invention, that to achieve excellent embossing fidelity (the capability of achieving a sharp, accurate and permanent transference of an embossing plate design from an embossing plate to a board surface) in an OSB fiberboard overlay, the fiberboard overlay should be air laid (formed by the dry process) onto the OSB surface. If the fiberboard overlay applied over an OSB surface is water laid (formed by the wet process), as suggested in the prior art, the sharp corners and other embossing precision necessary for high quality transference of an embossing plate design is not possible. Unexpectedly, it has been found that the application of a dry layer of a mixture of defibrated fiber and resin binder over an OSB surface enables exact and precise transference of embossing plate details into the surface of the fiberboard overlay. Further, the bonding achieved at the interface between the OSB and the dry process fiberboard overlay, and the resistance to weathering of the fiberboard overlay are unexpectedly better when the fiberboard overlay is formed by the dry process (the fibers are laid over the OSB by gravity from a mixture with air, or mechanically, and are contacted with a binder resin during the fall of fibers onto the OSB surface, and generally contain less than about 15% water). As set forth in more detail hereinafter, the bonding is unexpectedly higher and the boil swell values substantially lower for the OSB-fiberboard composite products of the present invention than for a similar product that includes a fiberboard overlay applied by the typical wet process.

It has heretofore been generally accepted by those skilled in the art that an OSB baseboard and a fiberboard overlay will not form a good bond at their interface and that the differential in dimensional and elastic properties of the two materials will result in delamination because of moisture cycling due to weather conditions. This conventional wisdom also advised against using dried board trim waste as a raw feed to the fiber pulping operation because of residual bonded and consolidated resin. While this theory has been verified for OSB-wet process fiberboard composite structures, surprisingly and unexpectedly, excellent bonding and resistance to weathering is achieved in accordance with the present invention by applying a fiberboard overlay by the dry process to an OSB baseboard. Additional advantages are achieved by forming the OSB such that the smallest flakes of the OSB are disposed at the fiberboard interface, as will be described in more detail hereinafter. Furthermore, those skilled in the art have anticipated warping of the product if the overlay was applied only to one surface but, in accordance with the present invention, it has been found that the expected warping does not occur when the fiberboard overlay, applied to only one major surface, is applied by the dry process.

SUMMARY OF THE INVENTION

The present invention combines the desirable attributes of OSB baseboard with the embossability, ease of finishing, bonding strength, and weatherability of a hardboard overlay. An OSB baseboard mat is overlain with a preformed dry fiber sheet and the two structures are consolidated and bonded in a single hot pressing. Because of the unconsolidated condition of the fiber overlay before hot pressing, and, unexpectedly, due to the fiberboard overlay being formed by the dry process, deep embossing of architectural profiles are possible without fracture of the overlay while achieving unexpectedly precise embossing fidelity. The dry process fiberboard overlay mat can be consolidated into a hardboard-like layer which has the smoothness, resistance to water penetration, weatherability, resistance to boil swell, and paint holdout of conventionally made hardboard used for siding. In accordance with one embodiment of the present invention, when the OSB baseboard is manufactured such that the smallest flakes are disposed at the OSB-fiberboard interface, the overlay masks flake telegraphing of even smooth-surfaced, unembossed product having a relatively thin fiberboard overlay, e.g., less than about ⅛ inch thick, e.g., about 3/32 inch thick.

To achieve the full advantage of the present invention, in accordance with one embodiment, sized board trim OSB waste can be used as feed for pulping for the dry process manufacture of the fiberboard overlay so that defiberized fiber from the OSB baseboard trim can be refined to form the dry process fiberboard overlay that is consolidated under heat and pressure to yield a product that has the stability, ease of working, and light weight of OSB and the architectural aesthetics, coatability, and weatherability of hardboard. The OSB-fiberboard composite structure shows no tendency to delaminate after severe moisture cycling between boiling water and hot oven conditions and remains free of warping over a wide range of moisture environments.

Accordingly, one aspect of the present invention is to provide an oriented strand board-fiberboard composite structure that has new and unexpected resistance to delamination of the fiberboard overlay and unexpected weatherability.

Another aspect of the present invention is to provide an oriented strand board-fiberboard composite structure that includes the surface deformability and aestetics of fiberboard as well as the structural strength of oriented strand board without separation of the fiberboard from the oriented strand board, wherein the fiberboard is felted by the dry process.

Still another aspect of the present invention is to provide an oriented strand board-fiberboard composite structure, wherein the oriented strand board is formed with the smallest flakes at the fiberboard interface to prevent telegraphing of the flakes through the fiberboard surface.

The above and other aspects and advantages of the present invention will become apparent from the following detailed description of the preferred embodiments taken in conjunction with the drawings.

BRIEF DESCRIPTION OF THE DRAWINGS

FIG. 1b is a side view of the OSB-fiberboard composite structure of FIG. 1a;

FIG. 2a is a profile view of the top flake layer of a conventional OSB product;

FIG. 2b is a profile view of the top flake layer of the preferred OSB-fiberboard composite structure of FIG. 1a;

FIG. 3b is a profile view of the conventional OSB product of FIG. 3a;

FIG. 4b is a profile view of the OSB-fiberboard composite structure of FIG. 4a;

FIG. 5b is a profile view of the molded OSB-fiberboard composite structure of FIG. 5a.

DETAILED DESCRIPTION OF THE PREFERRED EMBODIMENTS

Figure 1A:
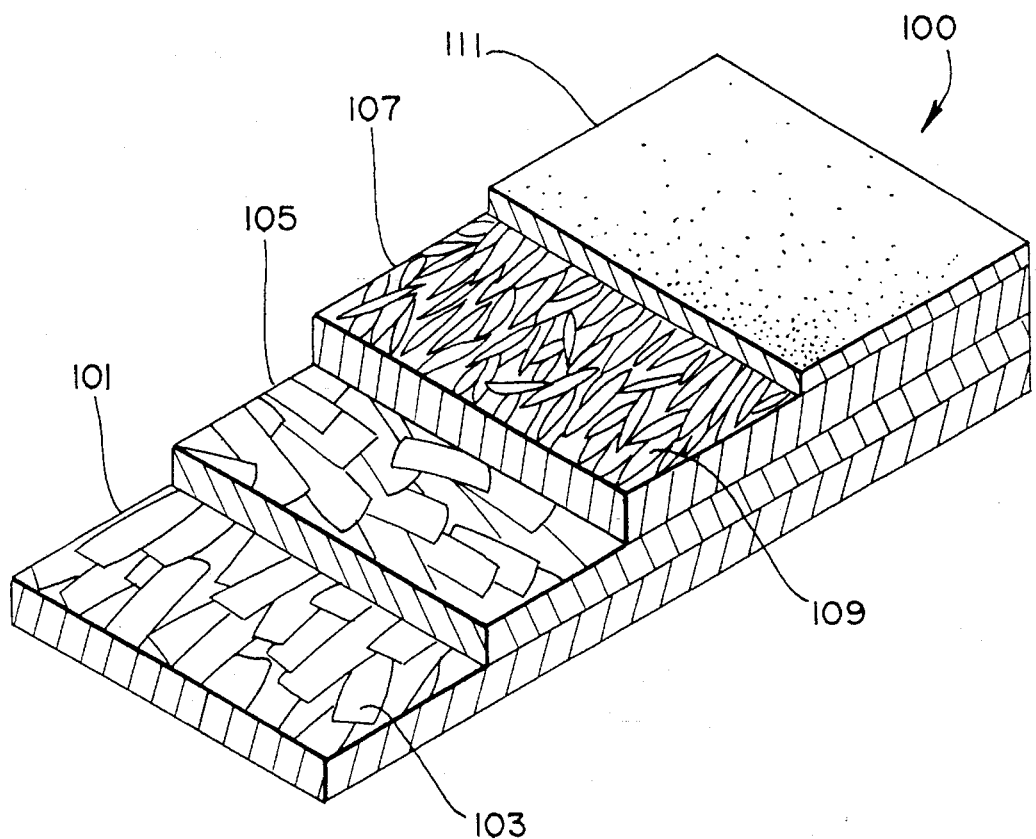
FIG. 1a is a cut-away perspective view of an OSB-fiberboard composite structure of the present invention.

Low density woods, such as aspen, have been preferred for making hot pressed oriented strand boards because the higher pressure needed to develop the board densities improves consolidation. The ratio of pressed board density to wood density is referred to as the compaction ratio. The compaction ratio of a product may be obtained by dividing the specific gravity of the product by the specific gravity of the wood. For example, a compaction ratio of about 1.23 is obtained for a product having a specific gravity of 0.665 which is made from Southern Yellow Pine having a specific gravity of 0.54. The specific gravity of the strands usually is in the range of about 0.45 to about 0.60. For aspen, the ratio is generally in the range of 1.6 to 1.8 using oven dry weights and green volumes.

In accordance with a preferred embodiment of the present invention, wood species of intermediate to high density are used to form the OSB flakes to achieve flakes that are relatively stiff and have a relatively high resistance to compression. When hot pressed, the stiff flakes in the OSB baseboard force the overlaying dry process fiberboard mat to undergo most of the resulting compaction, thereby developing maximum density in the overlay. In practicing this invention, wood species having an approximate specific gravity in the range of about 0.45 to about 0.60 are preferred. Wood flakes having a specific gravity in the range of about 0.45 to about 0.60 generally offer compaction ratios of 1.2 to 1.5. It is preferred that the final OSB-fiberboard product has an overall specific gravity of about 0.60 to about 0.80.

The preparation of flakes is accomplished in the usual manner so as to yield strands having aspect ratios (ratio of length to width) of about 5 to about 30, and moisture contents of about 15 percent or less, preferably about 1 to about 15 percent, based on the dry fiber weight. Generally, green logs having a moisture content of about 40% to about 60% by weight are sliced, and dried to, for example, about 3% by weight moisture, before being screened and contacted with resin. The strands are screened to separate out slivers, which are particles with a width of approximately ⅜ inch or less. To achieve the full advantage of the present invention in the forming of the OSB baseboard, the conventional practice of placing slivers in the core and larger strands on the faces is reversed. For siding, the core is made up of strands deposited in a random pattern or in the direction perpendicular to the machine direction, followed by larger strands adjacent to the core aligned parallel to the machine direction, followed by slivers arranged parallel to the machine direction. The purpose of the layer of slivers is to aid in masking the large strands that lay beneath and to provide a stiff layer to force the compression of the fiber overlay. This orientation, with the smallest strands at the fiberboard overlay interface achieves the best results for smooth-surfaced (non-embossed) product, particularly where the fiberboard overlay is in a layer of about 200 pounds of fiber, dry weight basis, per thousand square feet or less, to prevent telegraphing of flakes through the fiberboard overlay. For product containing thicker fiberboard overlays, or for product that is embossed-on the fiberboard overlay, the distribution of flakes in the OSB layer is less important.

In accordance with a preferred embodiment of the present invention, fiber for the overlay can be liberated, defiberized and refined from the rough trim cut from the ends and edges of the OSB layer, from the OSB-fiberboard composite structure. Such trim is consolidated board with cured resin and wax sizing with the layered structure typical of wafer boards and strand boards. The trim strips are chipped, e.g., in a drum chipper and steamed at pressures of about 25 to about 300 psig saturated steam pressure for a period of about 2 minutes to about 10 minutes, and refined under pressure in a pressurized refiner similar in operation to those used for producing fiber from chips. Because of the layered structure of OSB chips, steam readily penetrates the chip, permeates to the middle lamella (interfiber layer), softens the interfiber layer, and permits separation of the individual fibers into a pulp finer than that obtainable by refining log chips. The ready pulpability of the consolidated board trim, in accordance with the present invention, was unexpected to those skilled in the art, and the uniform fiber that results is very compliant and readily densifies into a hardboard layer under heat and pressure with unexpectedly precise embossing fidelity when applied by the dry process. Furthermore, the dried trim produces fiber having a moisture content of 15 percent by weight or less, based on the dry weight of the fiber, that does not require drying prior to hot pressing. An elevated moisture, up to about 15 percent by weight of dry fiber, contributes to the development of consolidation but is not a requirement for consolidation.

The strands preferably are blended with a hydrocarbon size (typically paraffinic or microcrystalline wax) in an amount of about 0.5% to about 4.0%, preferably about 2.5% based on the dry weight of the strands; and, a binder, resin, such as phenol formaldehyde resin or a polydiphenylmethyl diisocyanate (PMDI) resin, and delivered to the forming machine. The slivers are blended in a similar fashion with the same binder and size and delivered to a forming machine. The overlay fibers are blended with wax and resin, dry formed and laid separately by means of forced air or mechanical means, prepressed and transferred to the top major surface of the OSB baseboard mat.

The OSB baseboard is formed preferably in three layers, the first and third using air or mechanical classification to classify the particles so that, preferably, the finest particles are the first down on the forming belt and the last down on the mat. The first layer is laid with the strands oriented in the machine direction. The core is formed with randomly oriented strands or with the strands oriented in the cross machine direction. The third layer is laid with the strands oriented in the machine direction and preferably with graduation from coarse strands to slivers so that the smallest strands are disposed against the fiberboard overlay. Once the three layered mat is formed, the preformed dry process overlay is deposited upon it and the total mat (OSB-fiberboard composite structure) is prepressed prior to cutting into lengths for loading into the platen press for final consolidation.

The formulation of the furnish and the basis weight of the OSB baseboard mat and the overlay can be varied widely without going beyond the scope of the present invention. It is preferred that a phenol formaldehyde resin or isocyanate resin binder be used with microcrystalline or paraffinic waxes for sizing. The preferred furnish formulas are generally about 2 to about 10 percent by weight resin and about 0.5 to about 2.5 percent by weight wax based on the dry weight of the fiber. OSB baseboard basis weight can be varied between about 1,000 and about 2,000 pounds/thousand square feet with about 1,200 to about 1,700, e.g., 1,500 pounds/thousand square feet being preferred. The dry process fiberboard overlay basis weight can range between about 75 and about 400 pounds/thousand square feet with about 150 to about 300 pounds/thousand square feet preferred.

Final pressing of the OSB-fiberboard prepressed composite mat to fully consolidate the composite board preferably should be limited to prevent over compaction of the board which increases thickness swelling potential. Although the pressed board will typically be between about 0.25 and about 1.0 inch thick, the preferred product is about 0.400 to about 0.500 inch thick with an overall density in the range of about 38 to about 47 pounds per cubic foot (specific gravity in the range of about 0.60 to about 0.75 oven dry weight and air dry volume basis). This leads to a compaction ratio of approximately 1.3 for a species such as southern yellow pine. Under these conditions, the dry process fiberboard overlay will average about 50 to about 55 pounds per cubic foot, which is typical for hardboard siding. At a given overall product density, the density of the hardboard overlay can be increased by using fiber moisture contents of approximately 15 percent or less, e.g., 12 percent by weight of dry fiber, and flake moisture contents of about 8 percent or less, e.g., 6 percent by weight of dry flakes. This leads to compliant fiber and relatively stiff flakes which foster tighter overlay surfaces having properties of excellent embossing fidelity, bonding to the OSB baseboard, and weatherability.

In those instances of embossing deep enough to cause overdensification of the baseboard along deepest embossing contours, the hot press can be outfitted with a backer plate that is roughly contoured to complement the contours of the top embossing plate. In this manner, the top and bottom embossing plates become a die set which molds the OSB baseboard to a shape that permits deep embossing of the top surface while creating sharp outside corners in the overlay fibers and near uniform density in the baseboard, with a contoured OSB baseboard, instead of overdensification of fiberboard along lines of deepest embossing. The molded (contoured) profile of the OSB baseboard can be sanded on the back surface, if necessary, to restore a flat surface that facilitates installation against a flat support surface, e.g., as siding.

A further benefit of molding the product in a die set to contour both major surfaces of the OSB-fiberboard composite structure is the opportunity to densify specific regions of the product that will subsequently be cut or shaped by cutters to facilitate proper installation. Densification improves machineability and the quality of resulting cut surfaces and also enhances the resistance of any cut surfaces to the entry of water.

Turning now to the drawings, and initially to FIG. 1a, a portion of an OSB-fiberboard composite structure 100 is cut away to show several details of its construction. Bottom flake layer 101 is comprised of wood strands and slivers oriented generally in the machine direction, with a strand fraction 103 on its uppermost surface, nearest middle flake layer 105. Middle flake layer 105 is comprised of wood strands oriented generally in the cross-machine direction. Top flake layer 107 is disposed above middle flake layer 105 and is comprised of wood strands and slivers, oriented generally in the machine direction with a strand fraction nearest the middle flake layer 105 and a sliver fraction 109 disposed on the uppermost surface of flake layer 105. Construction of the OSB-fiberboard composite structure 100 is completed with the addition of a dry process fiberboard overlay 111 upon the top surface of top flake layer 107.

Figure 1B:
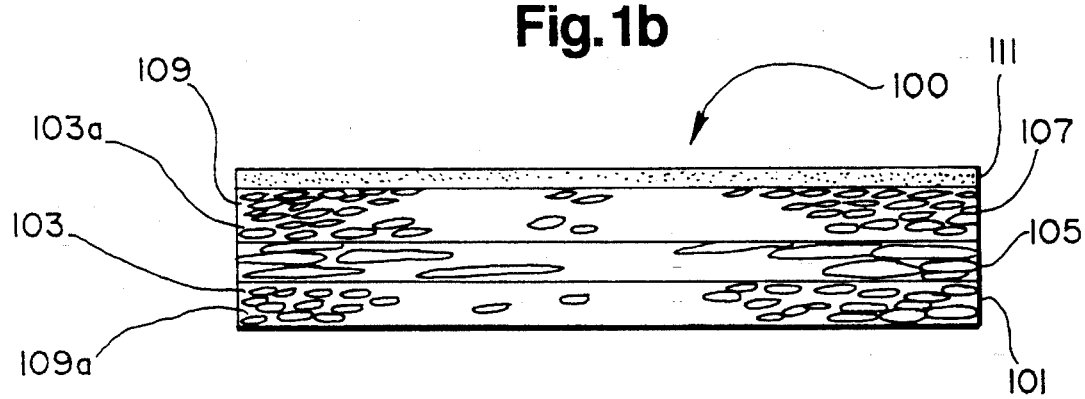

As shown in FIG. 1b, the OSB-fiberboard composite structure 100 is comprised of bottom flake layer 101, middle flake layer 105, top flake layer 107 and dry process fiberboard overlay layer 111, wherein sliver fractions 109 and 109a are seen at the upper surface of top flake layer 107 and the lower portion of bottom flake layer 101, respectively. Strand fractions 103 and 103a are seen at the lower portion of top flake layer 107 and the upper portion of bottom flake layer 101, respectively.

FIG. 2a depicts a profile of a conventional top flake layer 200 having its strand fraction 201 oriented near the top surface and its sliver fraction 203 oriented near its bottom surface.

FIG. 2b depicts a profile of top flake layer 107 from the board shown in FIG. 1a, having a sliver fraction 109 oriented near the fiberboard interface and a strand fraction 103a oriented near the bottom portion of the flake layer 107.

Figure 3A:
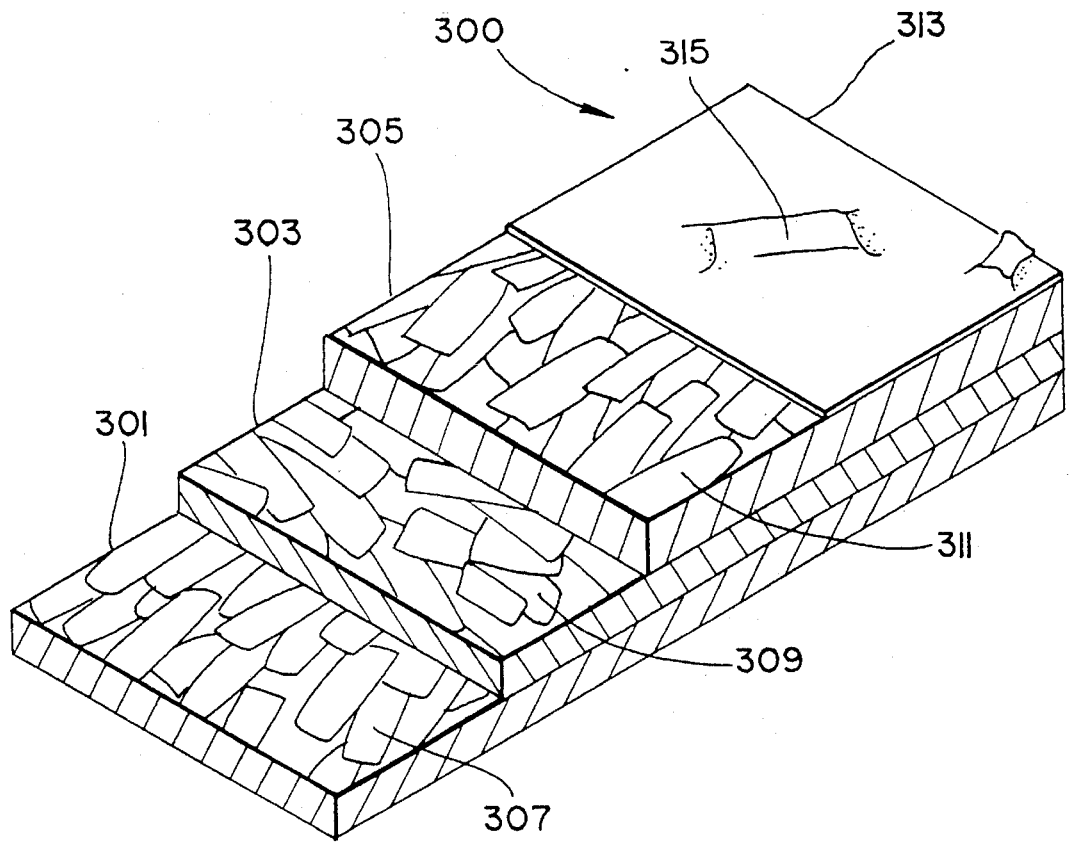
FIG. 3a is a cut-away perspective view of a conventional OSB product in board form utilizing strands in the top flake layer and exhibiting a telegraphed flake in the surface of a thin paper overlay.
Figure 3B:
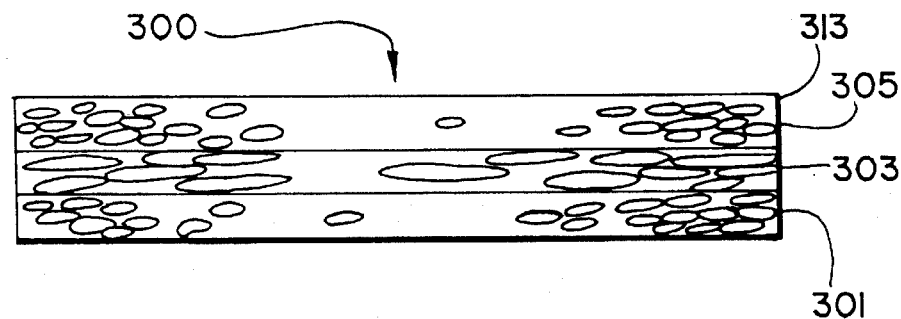

FIGS. 3a and 3b show a conventional OSB product 300 in cut-away perspective and profile, respectively. The conventional product 300 is comprised of bottom flake layer 301, middle flake layer 303, top flake layer 305 and a thin paper overlay 313. Wood strands 307 and 311 are oriented generally in the machine direction while strands 309 are oriented generally in the cross machine direction. Telegraphed flake 315 is an unsightly blemish in the thin paper overlay 313 and is one of the disadvantages seen in the use of conventional OSB product 300 in applications where appearance is important.

Figure 4A:
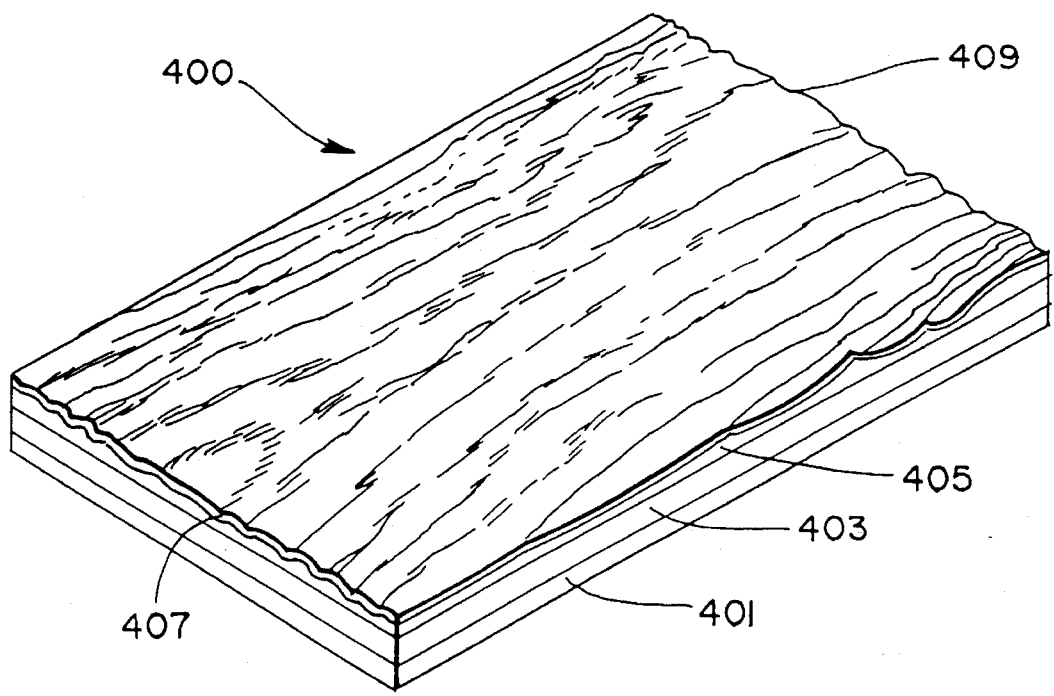
FIG. 4a is a perspective view of an OSB-fiberboard composite structure of the present invention having an embossed surface.
Figure 4B:
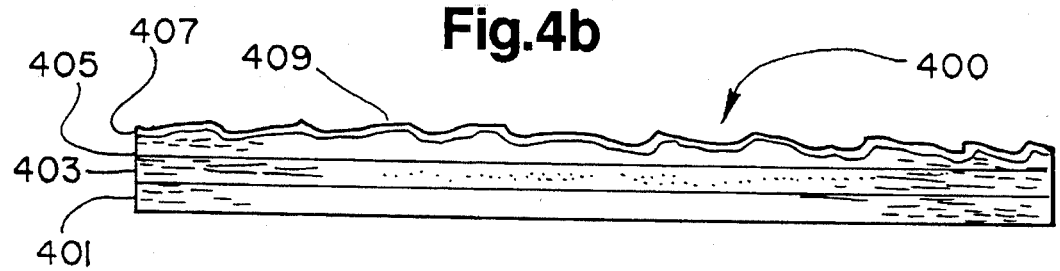

FIGS. 4a and 4b depict in perspective and profile view, respectively, an embossed OSB-fiberboard composite structure 400 of the present invention. The OSB-fiberboard composite structure 400 includes a bottom flake layer 401, a middle flake layer 403, a top flake layer 405 and a dry process fiberboard overlay layer 407 capable of receiving a suitable embossing impression, thereby exhibiting embossed surface 409.

Figure 5A:
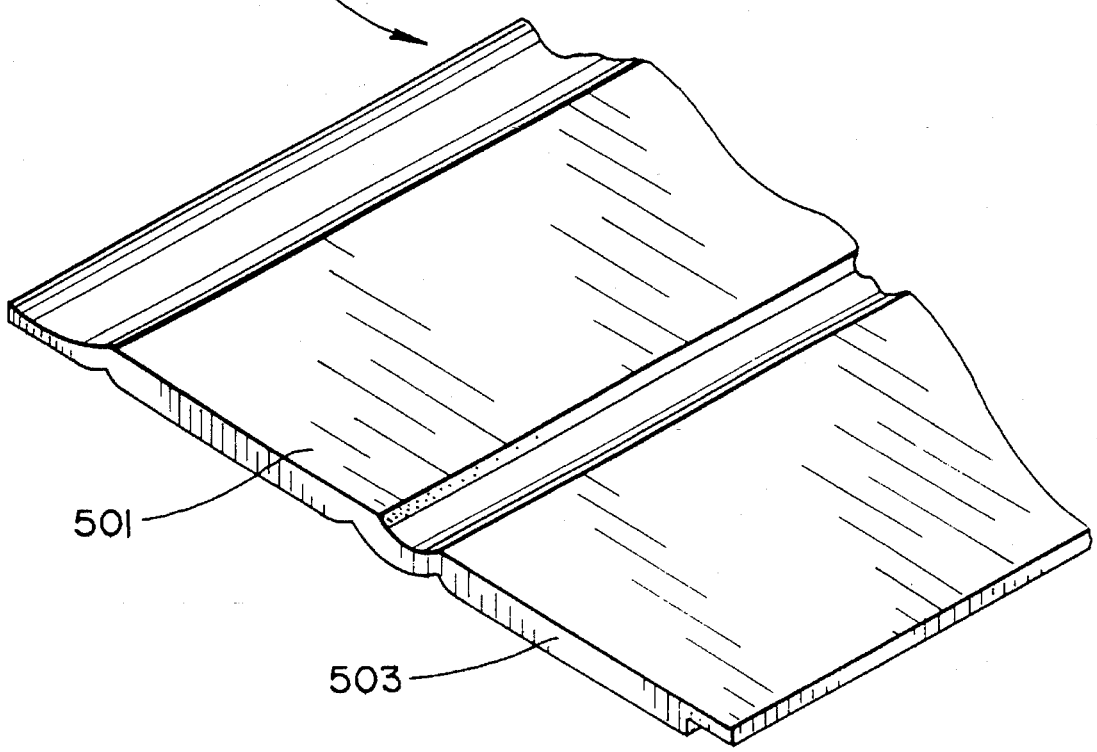
FIG. 5a is a perspective view of a molded OSB-fiberboard composite structure of the present invention.
Figure 5B:
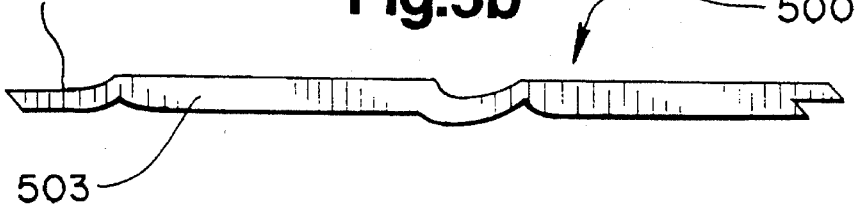

FIGS. 5a and 5b, respectively, depict a perspective and profile view of a molded dry process lain OSB-fiberboard composite structure, having a dry process fiberboard overlay surface over a three layer flake construction OSB.

The examples outlined below describe the manufacture of the OSB-fiberboard composite structure of the present invention using batch equipment, but non-embossed product also may be made using continuous equipment and continuous presses. In a continuous process, the surface layers are not separately screened to provide fine and coarse fractions but the distribution of the strands with standard distribution equipment will cause a transition area between the wider chips and the slivers. The examples are not intended to limit the scope of the invention.

EXAMPLE NO. 1

In this example, green southern yellow pine roundwood bolts were flaked in a pilot plant disk flaker to a thickness of 0.020 inch. The resulting strands had a length less than about 3 inches and a width less than about 1 inch, with the average being about ½ inch in width. These strands were dried in an oven to 3 percent moisture content and screened into two fractions, one with a width of over ⅜ inch (strands) and one with a width less than ⅜ inch (slivers). These two fractions were handled separately thereafter. A screen analysis of the sliver fraction using a Ro-Tap analyzer yielded the weight fractions shown below:

| Screen Opening | Percent Retained |
| --- | --- |
| 0.371" | 0.0 |
| 0.185" | 7.2 |
| 0.131" | 27.3 |
| 0.093" | 19.4 |
| 0.046" | 31.2 |
| <0.046" | 14.9 |
| Total | 100.0 |

The wider fraction of strands was blended with about 6 percent phenol formaldehyde resin and about 2.0 percent paraffinic wax applied as an aqueous emulsion.

The sliver fraction, which comprised about ⅓ of the surface flake furnish, was blended with about 6.0 percent phenol formaldehyde resole resin formulated for OSB bonding and with about 2.0 percent emulsified paraffinic wax, both based on the dry wood weight. The use of phenolic resin in the sliver fraction prevents contact between the back of the board and the press platen which could lead to sticking in the press if isocyanate resin were used.

Fiber for the dry felted fiber mat was produced from OSB board trim waste that had been chipped by a commercial drum chipper, steamed in saturated steam for about 5 minutes at 125 psig, and refined in a commercial single disk pressurized refiner coupled to a digester. The fiber exited the refiner at 12 percent moisture content and 2.5 percent by weight, dry fiber basis, molten paraffinic wax was added. The fiber then was dried to about 5 percent moisture content in order to avoid blistering when deeply embossed. Once dry, the fiber was blended with about 4 percent neat PMDI.

The OSB was produced from the foregoing materials, first by laying down slivers having a basis weight of about 130 to about 170 pounds/thousand square feet by dropping them onto an orienting device comprised of metal strips on edge and arranged in parallel to form a series of slots through which the slivers would fall. This oriented the slivers in a direction generally parallel to the direction of the slots. The first layer of slivers was oriented in the machine direction. On top of the sliver layer was deposited a layer of larger strands oriented in the machine direction. This second, Strand layer had a basis weight of about 275 to about 355 pounds/thousand square feet. A core layer was deposited next by changing the orientation to the cross machine direction. The core layer had a basis weight of about 350 to about 430 pounds/thousand square feet. On top of the core layer was deposited a layer of wide strands oriented in the machine direction. This fourth layer had a basis weight of about 275 to about 335 pounds/thousand square feet. The fifth layer was deposited as slivers oriented in the machine direction. This fifth, sliver layer had a basis weight of about 130 to about 170 pounds/thousand square feet.

The dry felted fiber overlay mat was formed by dropping fiber through a coarse screen onto a fine screen and thereafter prepressing the mat to reduce its thickness about in half. The basis weight of the dry process fiber mat was 100 pounds/thousand square feet. The dry-formed mat was transferred to the top surface of the OSB baseboard mat and loaded into a hot press for final consolidation to provide a composite board having an overall basis weight of 1,500 pounds/thousand square feet.

The press cycle using a hydraulic press with heated platens at 750 psi pressure on the mat and at 417° F. for 5 minutes in order to consolidate the composite board. The 5 minutes press cycle duration included a decompression cycle of 20 seconds to permit releasing the board from the press without delamination or blistering. The density of the product was 41.5 pounds per cubic foot at an overall thickness of 0.440 inch. The press plate was smooth and treated with a release agent for PMDI before pressing.

EXAMPLE NO. 2

A board was made according to the procedures in Example No. 1 except that the basis weight of the dry felted fiber mat was 150 pounds/thousand square feet. The basis weight of the OSB core for this Example, as well as Examples 3–6, was decreased in an amount sufficient to provide a consistent overall basis weight of 1,500 pounds/thousand square feet.

EXAMPLE NO. 3

A board was made according to the procedures in Example No. 1 except that the basis weight of the dry felted fiber mat was 200 pounds/thousand square feet.

EXAMPLE NO. 4

A board was made according to the procedures in Example No. 1 except that the basis weight of the dry felted fiber mat was 250 pounds/thousand square feet.

EXAMPLE NO. 5

A board was made according to the procedures in Example No. 1 except that the basis weight of the dry felted fiber mat was 300 pounds/thousand square feet.

EXAMPLE NO. 6

A board was made according to the procedures in Example No. 1 except that the basis weight of the dry felted fiber mat was 350 pounds/thousand square fee.

The six boards described above were coated with a conventional hardboard thermosetting acrylic primer and entered into an accelerated aging chamber specifically designed to cause swelling of wood composite siding products that are vulnerable to swelling. In this chamber, vertically oriented specimens are subjected to 12 hours of water spray on the front face followed by heat of 135° F. for 12 hours. The chamber remains humid during the early stages of the dry cycle which increases the swelling capacity of water that has entered the specimen. The cycling procedure can be adjusted to repeat the wet and dry cycles for as many periods as may be required to test and compare the oriented strand board products. After 19 cycles, telegraphing was noted on the boards having overlay basis weights of 100 and 150 pounds/thousand square feet. Telegraphing was minimal on boards having a fiberboard overlay of 200 pounds/thousand square feet and no telegraphing was noted on boards having a fiberboard overlay with basis weights greater than 200 pounds/thousand square feet. Warping was noted in the boards having a fiberboard overlay of at least 350 pounds/thousand square feet but was not noted in the boards of lesser fiberboard overlay basis weight.

It is noted that smooth, unembossed OSB made according to the invention with dry felted fiber overlays having basis weights of about 200 to about 300 pounds/thousand square feet will weather free of telegraphing and warping. The combination of low compaction ratio (about 1.3) and thick overlay prevents the excessive thickness swelling of the baseboard flakes. Embossed OSB products of the present invention can have a wider ranging basis weight for the dry felted fiber overlay, e.g., about 100 to about 300 pounds per thousand square feet, and still weather free of telegraphing and warping.

Despite the unbalanced construction caused by applying the fiberboard overlay to the front surface without a corresponding overlay applied to the back surface, there is no warping if the basis weight of the overlay is limited to about 300 pounds/thousand square feet or less. This is an unexpected outcome with woodbased composites that normally warp severely if produced with unbalanced construction. It appears that warp is avoided with the overlays of about 300 pounds/thousand square feet or less because these thin overlays have very low elastic modulus and stiffness compared to the relatively thick OSB-baseboard. Therefore, the stiff baseboard can readily restrain the hygroexpansion of the fiberboard overlay without visible distortion. When the overlay exceeds about 300 pounds/thousand square feet, it exerts expansion forces sufficient to produce visible warping of the board.

EXAMPLE NO. 7

Experiments were conducted to compare wet- and dry-formed fiberboard overlay layers for identical oriented strand boards. It was found that dry-formed overlay mats are unexpectedly better than wet-formed overlay mats in terms of surface quality, including embossing fidelity and paintability, and bonding properties.

The following conditions were used in the preparation of the OSB-fiberboard composite structures:

| | |
|---|---|
| Moisture content of dry-formed overlay fiber | 6% |
| Moisture content of wet-formed overlay fiber | 6-10% |
| Resin content of dry-formed overlay fiber | 5% PMDI |
| Resin content of wet-formed overlay fiber | 5% Phenol Formaldehyde |
| Moisture content of flakes after blended with resins | 6.5-7.5% |
| Resin content of surface flakes (fine and large flakes) | 6% Borden LH96B Resin |
| Resin content of core flakes | 4% Mobay PMDI |
| Wax content of all flakes | 1.5% paraffin wax |
| Pre-press sealer | emulsion 2 g solids/ft2 R & H E-2761 |
| Pressing temperature | 420° F. |
| Pressing time | 5 min. |

The same fiber prepared from OSB trim was used for both forming processes. In the wet-forming process, the fiber was mixed with tap water, and the phenol formaldehyde (PF) resin was precipitated into the slurry with acetic acid. The mats were oven dried at 250° F. for 45 minutes and left at room temperature for 24 hours. Thicknesses of wet-formed mats after drying and dry-formed mats were ¾" and ½", respectively. A "Triple Four Pine Textured" die set was used for the moldability study. All boards were pressed with a 20"×20" laboratory press. For each forming process, three boards were made.

The surface quality was evaluated by visual examination. The paintability was evaluated by coating specimens with a Rohm & Haas primer. The bonding properties were tested by boiling 2"×2" specimens for one hour followed by oven-drying at 225° F. for 12 hours.

While fiber mats formed by both processes can be bound to the OSB substrate, the dry-formed overlay mat was unexpectedly superior to the wet-formed mat in surface quality. The tightness of the fiberboard overlay surfaces from the dry-forming process is much greater than that of wet-formed fiberboard overlay surfaces. Therefore, the dry-formed overlay shows a smoother surface, while the wet-formed overlay presents a rougher surface. The difference is more distinct in areas adjacent to deeply grooved or curved areas.

PAINTABILITY:

OSB specimens overlaid with dry-formed fiberboard mats exhibit better paint hold-out compared to those overlaid with wet-formed mats. It is more distinct in areas adjacent to the guide line groovings, where the specific gravity is considerably lower.

BONDING PROPERTIES:

Skin layers, which could be easily peeled off, were found on surfaces of wet-formed fiberboard overlay mats. Also, the wet-formed fiberboard overlays could be separated from OSB substrates. These are indications of resin pre-cure. The high amount of heat energy used to dry wet-formed mats could cause curing of the resin in fiberboard surface layers of mats.

Table 1 shows differences in caliper swelling after one hour boiling between the two mat forming processes. The wet formed OSB-fiberboard composite structure swelled a full 0.1 inch more in the fiberboard overlay than the dry process fiberboard overlay. The average caliper swelling of OSB overlaid with dry-formed mats is significantly and unexpectedly lower than that of OSB overlaid with wet-formed mats. After boiling, complete separation of wet-formed overlays from substrates was found, whereas, no delamination occurred in the OSB-dry process fiberboard composite structure.

TABLE I

| Caliper Swelling of Dry Formed and Wet Formed Overlay Mats After One Hour Boiling | |
|---|---|
| | Average Caliper Swelling (%) |
| Wet Formed | 49.667 |
| Dry Formed | 31.556 |

EMBOSSING FIDELITY:

OSB specimens overlaid with dry-formed fiberboard mats exhibited visually distinctly better embossing fidelity than OSB-wet process fiberboard structures. Sharp, precise transference of the details of the embossing plate, with transference of sharp corners was achieved with the dry process fiberboard overlays but not with wet process fiberboard overlays.

BONDING STRENGTH:

The OSB specimens overlaid with dry-formed fiberboard mats had an internal bonding strength of 90 psi vs. 78 psi for OSB specimens overlaid with the wet process mats.

It should be understood that the present disclosure has been made only by way of the preferred embodiments and that numerous changes in details of construction, combination and arrangement of parts can be resorted to without departing from the spirit and scope of the invention as hereunder claimed.

What is claimed is:

1. An oriented strand board-fiberboard composite structure that does not delaminate upon weathering comprising a multilayer oriented strand board core including a plurality of wood strand layers, including a first layer formed from wood strands oriented generally in a random or cross-machine direction and a second layer bonded to said first layer, and formed from wood strands oriented in a direction generally perpendicular to said first layer; and a dry felted wood fiber overlay layer, including fibrillated, entangled wood fibers, bonded to the core.

2. The board of claim 1, wherein said wood strands are comprised of flakes and slivers having a specific gravity of about 0.45 to about 0.60 having a moisture content of about 1 to about 15 percent by weight, based on the dry fiber weight.

3. The board of claim 1 made with a dry felted wood fiber mat that is preformed separately from the core and which is prepressed and transferred onto the core as an overlay mat prior to consolidation of the core and the mat simultaneously.

4. The board of claim 1, wherein the wood strands are bonded with a resin selected from the group consisting of phenol formaldehyde resin and polydiphenylmethyl diisocyanate resin and wherein the resin is added to the strands in an amount of about 2 to about 10 percent by weight of the dry weight of strands.

5. The board of claim 1, wherein the dry felted wood fiber overlay layer is bonded with a resin selected from the group consisting of phenol formaldehyde resin, polydiphenylmethyl diisocyanate resin and mixtures thereof in an amount of about 2 to about 10 percent by weight, based on the dry fiber weight.

6. The board of claim 1, wherein the strands are sized with a hydrocarbon wax selected from the group consisting of paraffinic wax, microcrystalline wax and mixtures thereof in an amount of about 0.5 to about 2.0 percent by weight of the dry weight of the wood strands.

7. The board of claim 1, wherein the overlay wood fibers are sized with a hydrocarbon wax selected from the group consisting of paraffinic wax, microcrystalline wax and mixtures thereof in an amount of about 0.5 to about 4.0 percent by weight of the dry weight of fibers.

8. The board of claim 1, wherein the basis weight of the oriented strand board is in the range of about 1,000 pounds/thousand square feet to about 2,000 pounds/thousand square feet.

9. The board of claim 1, wherein the basis weight of the dry felted fiberboard overlay is in the range of about 75 pounds/thousand square feet to about 400 pounds/thousand square feet.

10. The board of claim 1, wherein all layers of the composite structure have been consolidated under heat and pressure in a single press cycle.

11. An oriented strand board-fiberboard composite structure comprising a plurality of layers of oriented strand board material forming a core, each layer loosely formed separately and disposed one above the other, wherein a top layer is a layer of oriented strand board material having wood strands of varying dimensions, and an overlay secured to the oriented strand board core such that the overlay does not delaminate upon weathering, said overlay formed into a handleable dry-felted fiberboard mat including entangled, fibrillated wood fibers and, thereafter, hot pressed to consolidate the fiberboard mat simultaneously with hot pressing the oriented strand board core to bond the core and the fiberboard mat together, said fiberboard overlay having a planar outer surface.

12. The board of claim 11, wherein said core is comprised of flakes and slivers having a specific gravity of about 0.45 to about 0.60 and having a moisture content of about 1 to about 15 percent by weight of the dry fibers.

13. The board of claim 11, wherein the fiberboard mat is preformed separately from the core such that the wood fibers are of sufficient length to provide interlocking of mat fibers so that the mat can be positioned onto the oriented strand board core prior to bonding the mat to the core.

14. The board of claim 11, wherein the wood strands of the oriented strand board layer are bonded with a resin selected from the group consisting of phenol formaldehyde resin and polydiphenylmethyl diisocyanate resin and which is added to the strands in an amount of about 2 to about 10 weight percent of the dry weight of strands.

15. The board of claim 11, wherein the wood strands are formed with the coarest strands farthest from the fiberboard mat layer.

16. An oriented strand board-fiberboard composite structure that does not delaminate upon weathering comprising a multilayer oriented strand board core including a plurality of wood strand layers, including a layer formed from wood strands oriented generally in a random or cross-machine direction and another layer bonded thereto, and formed from wood strands oriented in a direction generally perpendicular to said first layer; and a dry-felted wood fiber overlay layer including fibrillated, entangled wood fibers, each layer formed separately, with the dry-felted wood fiber overlay bonded to an outer surface of the core, said overlay having a planar outer surface.

17. The board of claim 16 made with a dry-felted wood fiber mat that is preformed separately from the core and which is prepressed and transferred onto the core as a mat prior to consolidation of the core and the mat simultaneously while pressing said planar surface into the overlay layer.

18. The board of claim 16, wherein the dry-felted wood fiber mat is bonded with a resin selected from the group consisting of phenol formaldehyde resin, polydiphenylmethyl diisocyanate resin and mixtures thereof in an amount of about 2 to about 10 percent by weight, based on the dry fiber weight.

19. The board of claim 16, wherein the basis weight of the dry-felted fiberboard overlay is in the range of about 75 pounds/thousand square fee to about 400 pounds/thousand square feet.

20. An oriented strand board-fiberboard composite structure that does not delaminate upon weathering comprising a multilayer oriented strand board core including three wood strand layers, including a second layer formed from wood strands oriented generally in a random or cross-machine direction and first and third adjacent layers formed from wood strands oriented in a direction generally perpendicular to said second layer; and a dry-felted wood fiber overlay layer including fibrillated, entangled wood fibers, said dry-felted wood fiber overlay layer bonded to the first or third oriented strand board layer.

21. The board of claim 1, wherein the core comprises a first layer of wood strands, a second layer of wood strands, and a third layer of wood strands, with the strands of first and third layers oriented in a machine direction, and the strands of the second layer being randomly oriented, or oriented in the cross-machine direction.

* * * * *